United States Patent
Huang et al.

(10) Patent No.: US 10,137,553 B2
(45) Date of Patent: Nov. 27, 2018

(54) ABRASIVE BELT GRINDING CENTER APPLICABLE TO GRINDING AND POLISHING OF WHOLE PROFILE OF BLISK

(71) Applicants: CHONGQING UNIVERSITY, Chongqing (CN); CHONGQING SAMHIDA GRINDING MACHINE COMPANY, Chongqing (CN)

(72) Inventors: Yun Huang, Chongqing (CN); Junfeng Yang, Chongqing (CN); Guijian Xiao, Chongqing (CN); Lai Zou, Chongqing (CN); Ying Liu, Chongqing (CN); Ping Li, Chongqing (CN)

(73) Assignees: CHONGQING UNIVERSITY, Chongqing (CN); CHONGQING SAMHIDA GRINDING MACHINE COMPANY, Chongqing (CN)

(*) Notice: Subject to any disclaimer, the term of this patent is extended or adjusted under 35 U.S.C. 154(b) by 0 days.

(21) Appl. No.: 15/546,135

(22) PCT Filed: Dec. 13, 2016

(86) PCT No.: PCT/CN2016/109691
§ 371 (c)(1),
(2) Date: Jul. 25, 2017

(87) PCT Pub. No.: WO2018/000746
PCT Pub. Date: Jan. 4, 2018

(65) Prior Publication Data
US 2018/0222006 A1    Aug. 9, 2018

(30) Foreign Application Priority Data

Jun. 29, 2016 (CN) .......................... 2016 1 0488827

(51) Int. Cl.
*B24B 21/16* (2006.01)
*B24B 21/18* (2006.01)
(Continued)

(52) U.S. Cl.
CPC ............ *B24B 21/16* (2013.01); *B23Q 1/4833* (2013.01); *B23Q 1/4871* (2013.01); *B23Q 1/623* (2013.01);
(Continued)

(58) Field of Classification Search
CPC ..... B24B 21/16; B24B 21/004; B24B 21/008; B24B 21/165; B24B 21/18; B24B 19/14;
(Continued)

(56) References Cited

U.S. PATENT DOCUMENTS 4,509,296 A * 4/1985 Rasmussen ......... B24B 27/0084
269/74
5,193,314 A * 3/1993 Wormley ................ B24B 19/14
451/11
(Continued)

FOREIGN PATENT DOCUMENTS

CN 101249628 A 8/2008
CN 102729124 A 10/2012
(Continued)

OTHER PUBLICATIONS

International Search Report for PCT/CN2016/109691, dated Mar. 2, 2017, ISA/CN.
(Continued)

*Primary Examiner* — George Nguyen
(74) *Attorney, Agent, or Firm* — U.S. Fairsky LLP; Yue (Robert) Xu

(57) ABSTRACT

An abrasive belt grinding center applicable to grinding and polishing of a whole profile of a blisk is provided, an X-axis feed mechanism, a Y-axis feed mechanism, a Z-axis feed
(Continued)

mechanism, a B-axis rotation mechanism and a C-axis rotation mechanism constitute a grinding head feed mechanism, and a housing, a drum, a synchronous driven pulley, a synchronous belt, a synchronous driving pulley, and a grinding head rotation driving motor constitute a grinding head rotation mechanism. In the present application, two grinding heads are utilized to reasonably assign the machining angle and the feeding, and rough machining and fine machining can be both realized by one time of clamping, and the combination of six degrees of freedom in space is achieved by a short drive chain, and further the rigidities of a grinding head mechanism and a workpiece clamping mechanism are ensured.

18 Claims, 5 Drawing Sheets

(51) Int. Cl.
   B24B 19/14    (2006.01)
   B24B 21/00    (2006.01)
   B24B 27/00    (2006.01)
   B24B 41/02    (2006.01)
   B23Q 1/48     (2006.01)
   B23Q 1/62     (2006.01)

(52) U.S. Cl.
   CPC ......... *B24B 19/14* (2013.01); *B24B 21/004* (2013.01); *B24B 21/008* (2013.01); *B24B 21/165* (2013.01); *B24B 21/18* (2013.01); *B24B 27/003* (2013.01); *B24B 27/0076* (2013.01); *B24B 27/0084* (2013.01); *B24B 41/02* (2013.01); *B23Q 2210/006* (2013.01)

(58) Field of Classification Search
   CPC .......... B24B 27/003; B24B 27/0076; B24B 27/0084; B24B 41/02; B23Q 1/4833; B23Q 1/4871; B23Q 1/623; B23Q 2210/006
   USPC .......................................... 451/303
   See application file for complete search history.

(56) References Cited

U.S. PATENT DOCUMENTS

| 5,347,760 | A | | 9/1994 | Miyauch et al. | |
| 5,357,714 | A | * | 10/1994 | Landhuis | B24B 9/007 451/303 |
| 5,658,189 | A | * | 8/1997 | Kagamida | B24B 9/065 451/194 |
| 2010/0003895 | A1 | * | 1/2010 | Bettermann | B24B 7/02 451/28 |
| 2010/0105299 | A1 | * | 4/2010 | Ettinger | B24B 9/065 451/303 |
| 2010/0261411 | A1 | * | 10/2010 | Reinmoeller | B24B 17/00 451/5 |
| 2010/0275748 | A1 | | 11/2010 | Wang | |
| 2012/0318190 | A1 | * | 12/2012 | Jost | B24B 21/16 118/35 |
| 2013/0273818 | A1 | * | 10/2013 | Guan | B24B 27/0076 451/270 |

FOREIGN PATENT DOCUMENTS

| CN | 102848289 A | 1/2013 |
| CN | 103612185 A | 3/2014 |
| CN | 104669091 A | 6/2015 |
| CN | 104907909 A | 9/2015 |
| CN | 106112752 A | 11/2016 |
| DE | 102010047510 A1 | 4/2012 |
| GB | 2270273 B | 9/1995 |

OTHER PUBLICATIONS

The Extended European Search Report dated Jun. 8, 2018.
The 1st Office Action regarding Chinese Patent Application No. CN201610488827.0, dated Sep. 7, 2017. English Translation Provided by http://globaldossier.uspto.gov.

* cited by examiner

ABRASIVE BELT GRINDING CENTER APPLICABLE TO GRINDING AND POLISHING OF WHOLE PROFILE OF BLISK

This application is the national phase of International Application No. PCT/CN2016/109691, titled "ABRASIVE BELT GRINDING CENTER APPLICABLE TO GRINDING AND POLISHING OF WHOLE PROFILE OF BLISK", filed on Dec. 13, 2016, which claims the benefit of priority to Chinese Patent Application No. 201610488827.0 titled "ABRASIVE BELT GRINDING CENTER APPLICABLE TO GRINDING AND POLISHING OF WHOLE PROFILE OF BLISK", filed with the Chinese State Intellectual Property Office on Jun. 29, 2016, the entire disclosures of which are incorporated herein by reference.

FIELD

The present application relates to the field of the abrasive belt grinding technology, and particularly to an abrasive belt grinding center applicable to grinding and polishing of a whole profile of a blisk.

BACKGROUND

A blisk is a key component of a new generation aeroengine, and compared with traditional aeroengine blades, the application of the blisk facilitates performance improvement, mechanism simplification, mass reduction, reliability and durability improvements of the aeroengine. Polishing process, as the last procedure in the machining of the whole blisk, directly influences the surface quality and aerodynamic performance of the blisk. Since the blisk has a complicated structure and its material is also hard to machine, the machining of the blisk is very difficult. Although an electronic beam polishing, an electrolytic polishing and other polishing methods have appeared in China, they all have a low degree of automation and a low manual operation efficiency, and can hardly ensure the machining accuracy and surface quality, and are apt to cause damages to the blisk.

With the rapid development of the abrasive belt grinding technologies and devices, an abrasive belt grinding and polishing machine tool has developed into a fine machining device having a high machining efficiency, a strong adaptability, a wide application range, a low use-cost and being safe and convenient to operate. Its advantages are obvious especially for grinding and polishing thin walled structural members having a complex curved surface such as aeroengine blades, small-size complex profiles, and a junction between surfaces. Generally speaking, in an abrasive belt grinding and polishing machine tool, an abrasive belt is driven by a driving device to move, and the abrasive belt is tensioned by a certain number of tensioning wheels, and is supported by a contact wheel or a support plate to generate a contact pressure to a workpiece and form a cutting angle, to finish grinding and polishing of the workpiece.

In recent years, numerical control abrasive belt grinding machines have successfully realized polishing and grinding on some parts having complex curved surfaces such as turbine blades, aeroengine blades and gun clampers, and the abrasive belt also has good machining characteristics for materials which are difficult to machine. However, since the blisk has the characteristics such as a flow path profile and a blade profile thereof are both free curved surfaces, the channel between blades is narrow, the blade is thin and is easy to deform, and the material of the blisk is difficult to machine, the conventional grinding method cannot address issues such as the whole profile grinding of the blisk, the interference between a grinding tool and a workpiece in the grinding process, and the meshing between the grinding curved surfaces. Further, grinding textures on the surface of the blisk are generally transverse textures, however, the study shows that if the blisk has longitudinal textures, its fatigue strength may be greatly improved compared with the blades made by a conventional grinding method.

The results of the above study have not yet formed a very good abrasive belt grinding and polishing device to deal with the grinding and polishing of workpieces having a complex surface and an irregular-shaped structure represented by the blisk of the aeroengine, and a specialized abrasive belt grinding and polishing machine capable of machining such kind of workpieces has not been applied domestically yet. The following requirements have not been met yet such as realizing the whole profile grinding of the blisk of the aeroengine, eliminating the interference in grinding and achieving the longitudinal grinding to improve mechanical properties such as the fatigue strength.

SUMMARY

In view of the above deficiencies of the conventional technology, the technical issue to be addressed by the present application is to provide an abrasive belt grinding center applicable to the grinding and polishing of a whole profile of a blisk.

The technical solution of the present application is as follows. An abrasive belt grinding center applicable to grinding and polishing of a whole profile of a blisk includes a bed and a grinding head mechanism. An index plate holder is arranged at a middle of an upper surface of the bed, and a numerical control index plate is mounted at a top end of the index plate holder, and a grinding robot is provided at a rear of the numerical control index plate;

a Y-axis ram is provided at each of a left side and a right side of the index plate holder, a Y-axis screw rod is rotatably supported on each of the Y-axis ram, and the Y-axis screw rod at the left side and the Y-axis screw rod at the right side are splayed apart; one end of each of the Y-axis screw rods is coaxially connected to a respective Y-axis motor through a respective coupler, and a Y-axis screw rod nut seat threadedly mated with each of the Y-axis screw rods is fixed to a bottom side of a respective Y-axis sliding saddle;

an X-axis screw rod is rotatably supported on each of the Y-axis sliding saddle, and is perpendicular to the respective Y-axis screw rod, one end of the X-axis screw rod is connected to an X-axis motor through a coupler, and an X-axis screw rod nut seat threadedly mated with the X-axis screw rod is fixed to a bottom side of an X-axis sliding saddle;

a C-axis arc-shaped rack is mounted on an upper surface of the X-axis sliding saddle, a center of the C-axis arc-shaped rack is close to an axis of the numerical control index plate, a C-axis straight tooth cylindrical gear engaged with the C-axis arc-shaped rack is mounted on an output shaft of a C-axis driving right-angle reduction motor, and the C-axis driving right-angle reduction motor is mounted on an upper surface of a C-axis sliding saddle;

a pillar mounting support is provided on the upper surface of the C-axis sliding saddle, and a pillar is fixedly mounted on an upper surface of the pillar mounting support, a Z-axis screw rod is rotatably supported on a lateral side of the pillar, an upper end of the Z-axis screw rod is coaxially connected to a Z-axis motor through a coupler, the Z-axis motor is fixed to a top end of the pillar, and a Z-axis screw rod nut seat threadedly mated with the Z-axis screw rod is fixed to a back side of a Z-axis sliding saddle;

a B-axis arc-shaped rack is mounted on a front side of the Z-axis sliding saddle, a center of the B-axis arc-shaped rack coincides with a center of a contact wheel of the respective grinding head mechanism, and a B-axis straight tooth cylindrical gear engaged with the B-axis arc-shaped rack is mounted on an output shaft of a B-axis driving right-angle reduction motor, and the B-axis driving right-angle reduction motor is mounted on a front side of a B-axis sliding saddle; and a housing is provided on the front side of the B-axis sliding saddle, and a drum is mounted in a mounting hole of the housing by a bearing; the grinding head mechanism is mounted on the drum, and the contact wheel of the grinding head mechanism is toward the axis of the numerical control index plate, a synchronous driven pulley is coaxially fixed to the drum and is connected to a synchronous driving pulley by a synchronous belt, the synchronous driving pulley is sleeved on an output shaft of a grinding head rotation driving motor, and the grinding head rotation driving motor is mounted on the B-axis sliding saddle.

With the above technical solution, the numerical control index plate is configured to clamp the blisk and drive it to rotate, to facilitate selecting the blades of the blisk to be machined. In the present application, an X-axis feed mechanism, a Y-axis feed mechanism, a Z-axis feed mechanism, a B-axis rotation mechanism and a C-axis rotation mechanism constitute a grinding head feed mechanism, and the housing, the drum, the synchronous driven pulley, the synchronous belt, the synchronous driving pulley, and the grinding head rotation driving motor constitute a grinding head rotation mechanism, and the grinding head rotation mechanism realizes the adjustment of orientation and location of the grinding head. The present application has six degrees of freedom in space:

under the action of the X-axis feed mechanism, the X-axis sliding saddle can move rightward and leftward transversely on the Y-axis sliding saddle, to drive the C-axis sliding saddle and the pillar to make an X-axis movement, thereby achieving an X-axis movement of the contact wheel of the grinding head;

under the action of the Y-axis feed mechanism, the Y-axis sliding saddle can move forward and backward transversely on the Y-axis ram, to drive the X-axis sliding saddle, the C-axis sliding saddle and the pillar to make a Y-axis movement, thereby achieving a Y-axis movement of the contact wheel of the grinding head;

under the action of the Z-axis feed mechanism, the Z-axis sliding saddle can move upward and downward longitudinally on the pillar, to drive the B-axis sliding saddle and the grinding head mechanism to make a Z-axis movement, thereby achieving a Z-axis movement of the contact wheel of the grinding head;

under the action of the B-axis driving right-angle reduction motor, the B-axis sliding saddle makes a rotating and sliding movement on the pillar, to drive the grinding head mechanism to make a rotating movement about a center axis of the contact wheel, thereby achieving a B-axis movement of the contact wheel;

under the action of the C-axis driving right-angle reduction motor, the C-axis sliding saddle makes a rotating and sliding movement on the X-axis sliding saddle, to drive the pillar and the grinding head mechanism to rotate about the C-axis, thereby achieving a C-axis movement of the contact wheel; and under the action of the grinding head rotation driving motor, the synchronous driving pulley drives the synchronous driven pulley to rotate by the transmission of the synchronous belt, to drive the drum to rotate, thereby achieving an A-axis movement of the contact wheel.

In the present application, a winding roller of the grinding head mechanism is controlled to achieve the tensioning and replacing of an abrasive belt, and the contact wheel on the contact rod of the grinding head mechanism is used to tension the abrasive belt, to allow a portion, corresponding to the contact wheel, of the abrasive belt to perform grinding and polishing treatments to the blisk. Since the contact wheel, the contact rod, and the abrasive belt all has a small thickness, the grinding head is enabled to freely go into a narrow clearance between adjacent blades of the blisk, to complete corresponding polishing and grinding treatments. The above six degrees of freedom realize the free adjustment of the movement direction of the abrasive belt in the narrow clearance between two adjacent blades of the blisk, thus, when the contact wheel operates at a high speed, a stable contact between the contact wheel and the workpiece can be ensured.

In the present application, the design of the double grinding heads in combination with the grinding robot is employed, and by adjusting the machining orientation and location and feeding of the two grinding heads, rough machining and fine machining of the whole profile of the blisk can both be performed simply by one time of clamping, which significantly improves the working efficiency and reduces the labor intensity of the workers, and reduces the management and production costs on the premise of ensuring the machining dimension precision of the complex curved surface and the quality of the profile.

The numerical control index plate, as an orientation and location adjustment mechanism for the workpiece, can achieve indexing at 360 degrees, thus, each time after the two grinding heads finishes machining of one bade at the same time, a blade to be machined is enabled to enter the machining position by controlling the blisk to rotate.

For facilitating the mounting of the grinding robot, to allow the grinding robot to be mounted reliably, the grinding robot is mounted on a robot mounting support, the robot mounting support is fixed to the index plate holder, and the robot mounting support is in parallel with the upper surface of the bed.

Each of the Y-axis screw rods is supported on the respective Y-axis ram by a respective bearing support, two Y-axis linear guide rails are symmetrically arranged at two sides of each of the Y-axis screw rods respectively and are in parallel with the Y-axis screw rod, and the two Y-axis linear guide rails are fixed to an upper surface of the Y-axis ram, and the Y-axis sliding saddle is slidably cooperated with the two Y-axis linear guide rails through sliders on a bottom of the Y-axis sliding saddle. The above structure can ensure a flexible rotation of the Y-axis screw rods, and can ensure the movement of the Y-axis sliding saddle to have a great linearity and smoothness under the cooperatively guiding of the Y-axis linear guide rails and the sliders.

The X-axis screw rod is supported on an upper surface of the Y-axis sliding saddle by a bearing support, two X-axis linear guide rails are symmetrically arranged at two sides of the X-axis screw rod respectively and are in parallel with the X-axis screw rod, and the two X-axis linear guide rails are fixed to the upper surface of the Y-axis sliding saddle, and the X-axis sliding saddle is slidably cooperated with the two X-axis linear guide rails through sliders on a bottom of the X-axis sliding saddle. The above structure can ensure a flexible rotation of the X-axis screw rod, and can ensure the movement of the X-axis sliding saddle to have a great linearity and smoothness under the cooperatively guiding of the X-axis linear guide rails and the sliders.

Two C-axis circular arc-shaped guide rails are arranged at two sides of the C-axis arc-shaped rack respectively and are concentric with the C-axis arc-shaped rack, the two C-axis circular arc-shaped guide rails are fixed to the upper surface of the X-axis sliding saddle, and the C-axis sliding saddle is slidably cooperated with the two C-axis circular arc-shaped guide rails through sliders on a bottom of the C-axis sliding saddle. The above structure can allow the C-axis sliding saddle to move along the circular arc smoothly under the cooperatively guiding of the C-axis circular arc-shaped guide rails and the sliders.

The Z-axis screw rod is supported on the lateral side of the pillar by a bearing support, two Z-axis linear guide rails are arranged symmetrically at two sides of the Z-axis screw rod respectively and are in parallel with the Z-axis screw rod, the two Z-axis linear guide rails are fixed to the lateral side of the pillar, and the Z-axis sliding saddle is slidably cooperated with the two Z-axis linear guide rails through sliders on the back side of the Z-axis sliding saddle. The above structure can ensure a flexible rotation of the Z-axis screw rod, and can ensure the movement of the Z-axis sliding saddle to have a great linearity and smoothness under the cooperatively guiding of the Z-axis linear guide rails and the sliders.

Two B-axis circular arc-shaped guide rails are arranged at two sides of the B-axis arc-shaped rack respectively and are concentric with the B-axis arc-shaped rack, the two B-axis circular arc-shaped guide rails are fixed to the front side of the Z-axis sliding saddle, and the B-axis sliding saddle is slidably cooperated with the two B-axis circular arc-shaped guide rails through sliders on a back side of the B-axis sliding saddle. The above structure can ensure the B-axis sliding saddle to move along the circular arc smoothly under the cooperatively guiding of the B-axis circular arc-shaped guide rails and the sliders.

For simplifying the structure, facilitating the machining and reducing the production cost, the bed has a rectangular parallelepiped structure, the pillar has a hollow rectangular parallelepiped structure, and a length direction of the pillar is perpendicular to the upper surface of the bed.

Beneficial effects: in the present application, two grinding heads are utilized to reasonably assign the machining angle and the feeding, and rough machining and fine machining can be both realized by one time of clamping, and the combination of six degrees of freedom in space is achieved by a short drive chain, and further the rigidities of a grinding head mechanism and a workpiece clamping mechanism are ensured. The combination of double grinding heads and a grinding robot can achieve grinding and polishing of the whole profile of the blisk. The contact wheel of the grinding head mechanism and the abrasive belt can go into a small clearance between blades of the blisk, thus can significantly improve the machining efficiency and reduce the management and production costs on the premise of ensuring the machining precision of a complex curved surface and the quality of the profile.

Figure 1:
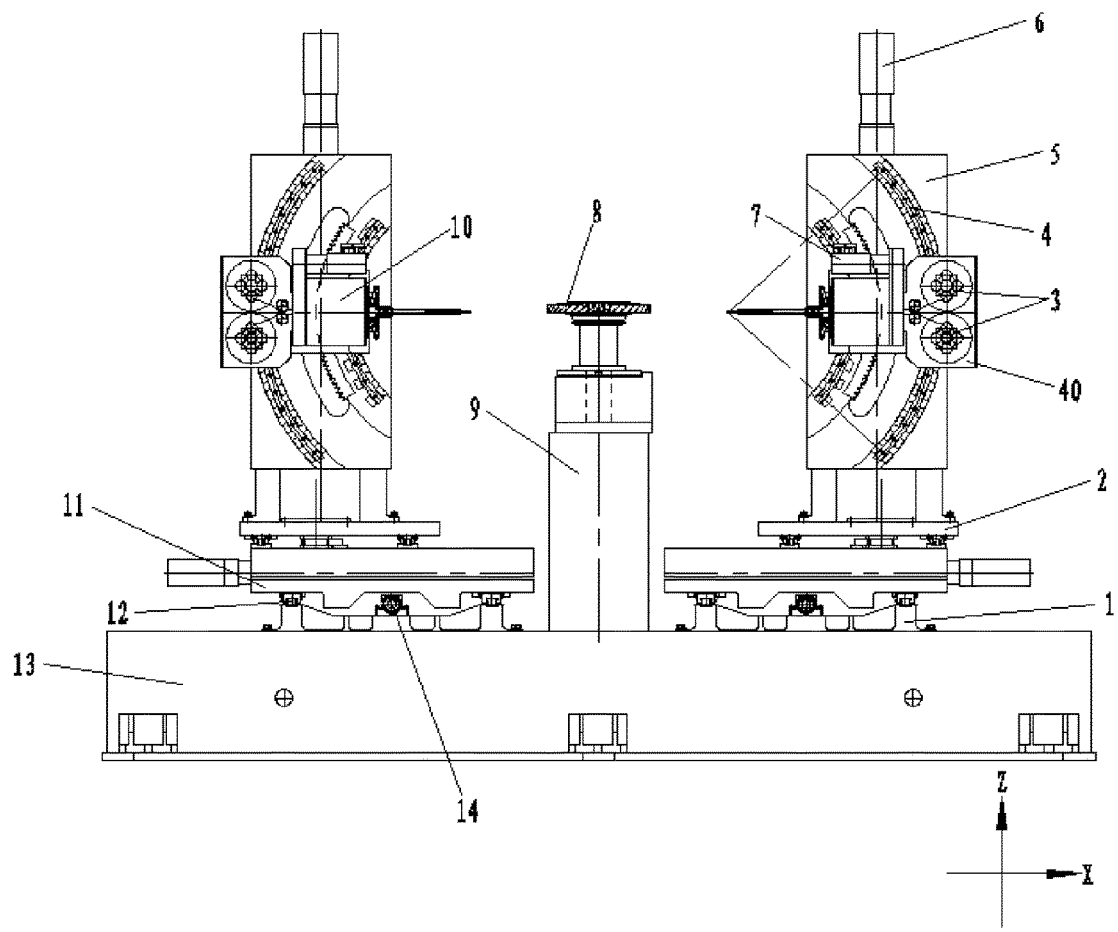
FIG. 1 is a front view of the present application.

| Reference Numerals: | |
|---|---|
| 1 Y-axis ram, | 2 C-axis sliding saddle, |
| 3 grinding head motor, | 4 B-axis circular arc-shaped guide rail, |
| 5 Z-axis sliding saddle, | 6 Z-axis motor, |
| 7 grinding head rotation driving motor, | 8 workpiece, |
| 9 index plate holder, | 10 grinding head mechanism, |
| 11 Y-axis sliding saddle, | 12 Y-axis linear guide rail, |
| 13 bed, | 14 Y-axis screw rod, |
| 15 X-axis linear guide rail, | 16 X-axis sliding saddle, |
| 17 B-axis driving right-angle reduction motor, | 18 B-axis sliding saddle, |
| 19 pillar, | 20 grinding robot, |
| 21 robot mounting support, | 22 C-axis straight tooth cylindrical gear, |
| 23 C-axis arc-shaped rack, | 24 X-axis screw rod, |
| 25 B-axis straight tooth cylindrical gear, | 26 B-axis arc-shaped rack, |
| 27 Z-axis screw rod, | 28 Z-axis linear guide rail, |
| 29 pillar mounting support, | 30 C-axis driving right-angle reduction motor, |
| 31 numerical control index plate, | 32 C-axis circular arc-shaped guide rail, |
| 33 Y-axis motor, | 34 X-axis motor, |
| 35 synchronous driving pulley, | 36 synchronous belt, |
| 37 synchronous driven pulley, | 38 housing, |
| 39 drum. | |

DETAILED DESCRIPTION

The present application is further described hereinafter with reference to the drawings and embodiments.

Figure 2:
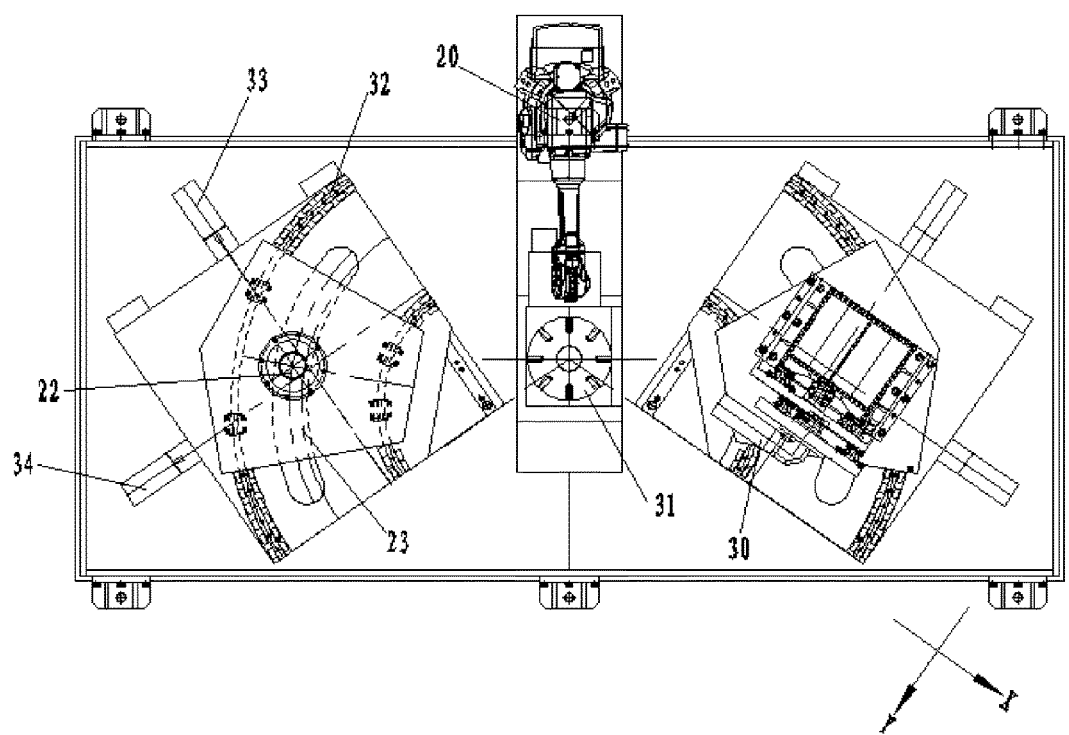
FIG. 2 is a top view of FIG. 1.
Figure 4:
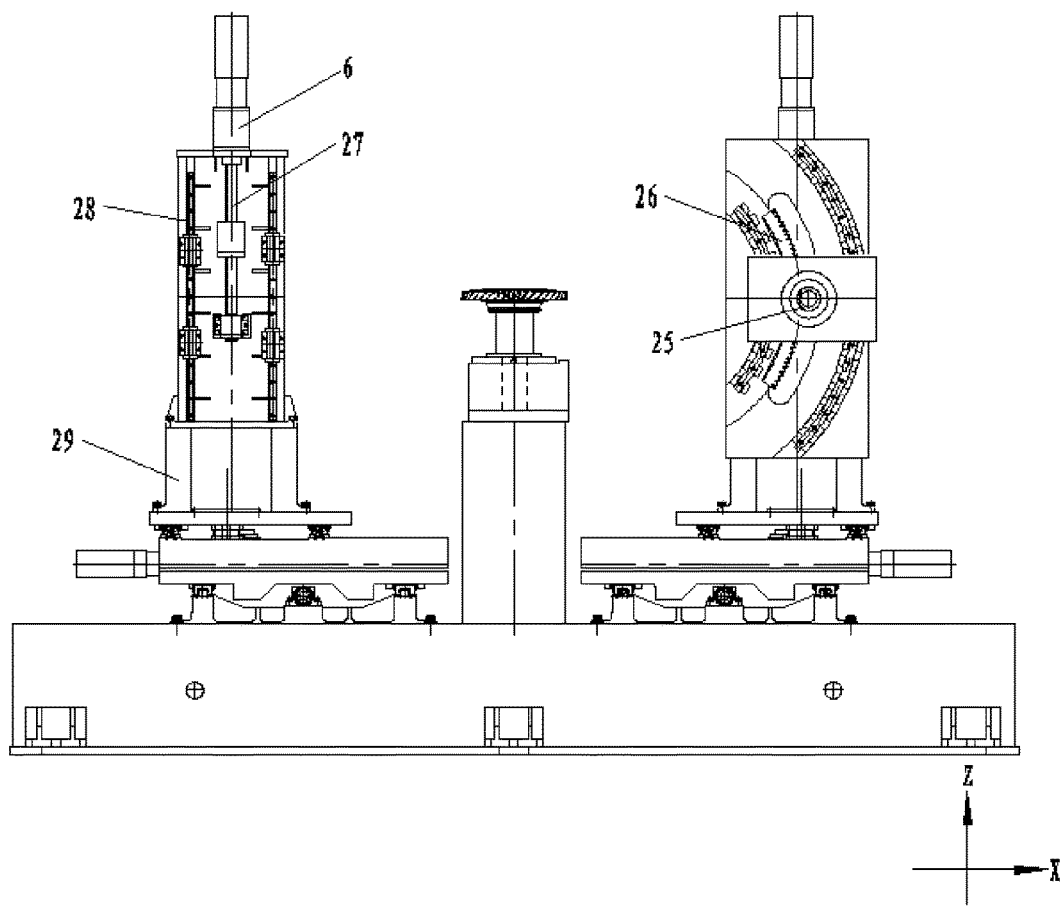
FIG. 4 is an auxiliary view of the present application in a front direction.

As shown in FIGS. 1, 2, and 4, a bed 13 has a rectangular parallelepiped structure, an index plate holder 9 is arranged at the middle of an upper surface of the bed 13 and is perpendicular to the upper surface of the bed 13. A lower end of the index plate holder 9 is fixed to the bed 13, and a numerical control index plate 31 is mounted at a top end of the index plate holder 9. The numerical control index plate 31 is arranged on the axis of symmetry of the grinding center, and a clamp is mounted by the numerical control index plate 31 to clamp a workpiece 8 and to allow the workpiece 8 to rotate about a Z axis. The structure and working principle of the clamp are conventional technology, and will not be described here.

Figure 3:
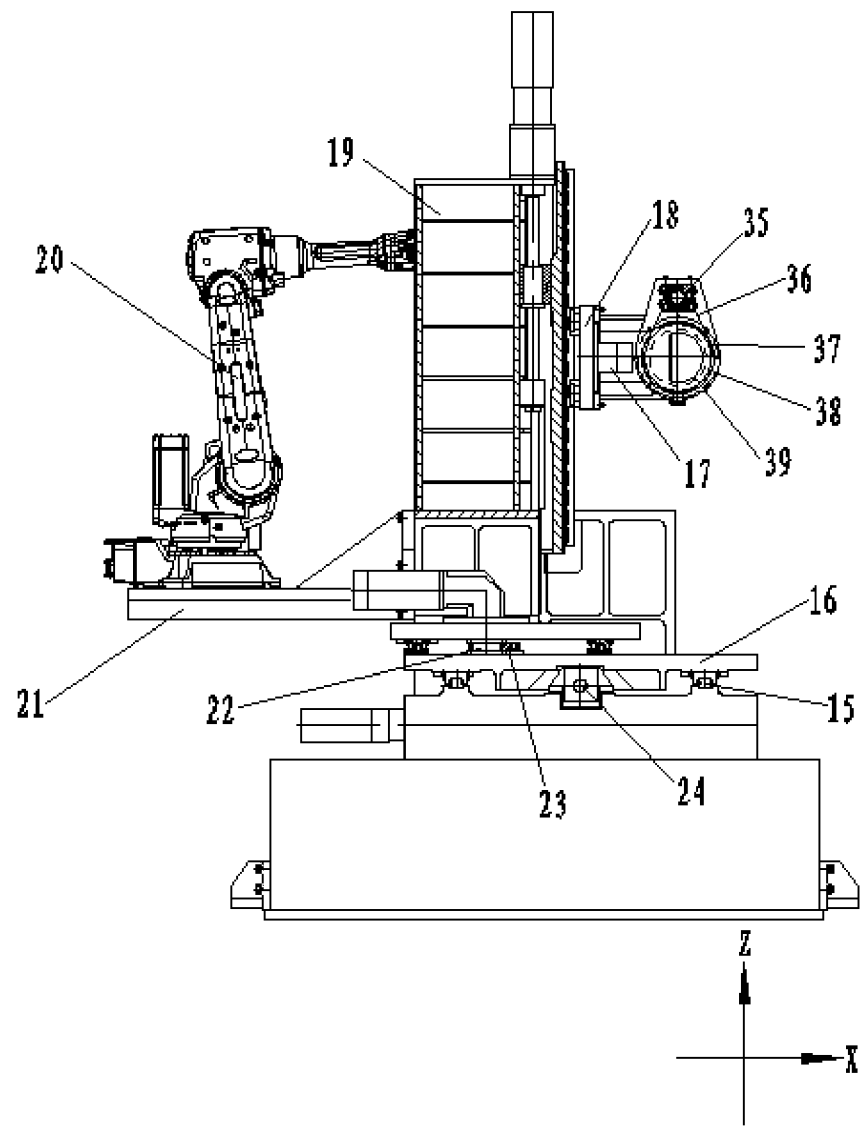
FIG. 3 is a left view of FIG. 1.

As shown in FIGS. 2 and 3, a grinding robot 20 is arranged at the rear of the numerical control index plate 31, and the grinding robot 20 is arranged on the axis of symmetry of the grinding center. The grinding robot 20 is mounted on a robot mounting support 21, the robot mounting support 21 is fixed to the index plate holder 9, and the robot mounting support 21 is in parallel with the upper surface of the bed 13. A tail end executor of the grinding robot 20 clamps a grinder to machine profiles, except for blades of the blisk, of the workpiece 8. The structure and working principle of the grinding robot 20 are the conventional technology and will not be described here.

As shown in FIGS. 1, 2 and 3, Y-axis rams 1 are symmetrically arranged at a left side and a right side of the index plate holder 9, and the Y-axis rams 1 are fixed to the upper surface of the bed 13. A Y-axis screw rod 14 is arranged on each of the Y-axis rams 1, and the Y-axis screw rods 14 at the left side and the right side are splayed apart, and are arranged symmetrically. An included angle between each of the Y-axis screw rods 14 and a length direction of the bed 13 is preferably 55 degrees. Each of the Y-axis screw rods 14 are supported on the respective Y-axis rams 1 by respective bearing supports. One end of each of the Y-axis screw rods 14 is coaxially connected to a Y-axis motor 33 through a coupler, and a Y-axis screw rod nut seat threadedly mated with the Y-axis screw rod 14 is fixed to a bottom side of a Y-axis sliding saddle 11. Y-axis linear guide rails 12 are symmetrically arranged at two sides of the Y-axis screw rod 14 and are in parallel with the Y-axis screw rod 14, and the Y-axis linear guide rails 12 are fixed to an upper surface of the Y-axis ram 1. The Y-axis sliding saddle 11 is slidably cooperated with the two Y-axis linear guide rails 12 through sliders on the bottom of the Y-axis sliding saddle 11. The Y-axis motor 33, the Y-axis screw rod 14, the Y-axis sliding saddle 11, the Y-axis linear guide rails 12, and corresponding sliders and the like constitute a Y-axis feed mechanism.

As shown in FIGS. 1, 2 and 3, an X-axis screw rod 24 is arranged on each of the Y-axis sliding saddles 11, and the X-axis screw rods 24 at the left and right sides are perpendicular to the Y-axis screw rods 14. The X-axis screw rod 24 is supported on an upper surface of the respective Y-axis sliding saddle 11 by a bearing support, one end of the X-axis screw rod 24 is connected to an X-axis motor 34 through a coupler, and an X-axis screw rod nut seat threadedly mated with the X-axis screw rod 24 is fixed to a bottom side of an X-axis sliding saddle 16. X-axis linear guide rails 15 are symmetrically arranged at two sides of the X-axis screw rod 24 and are in parallel with the X-axis screw rod 24, and the X-axis linear guide rails 15 are fixed to the upper surface of the Y-axis sliding saddle 11. The X-axis sliding saddle 16 is slidably cooperated with the two X-axis linear guide rails 15 through sliders on the bottom of the X-axis sliding saddle 16. The X-axis motor 34, the X-axis screw rod 24, the X-axis sliding saddle 16, the X-axis linear guide rails 15 and corresponding sliders and the like constitute an X-axis feed mechanism.

As shown in FIGS. 1, 2 and 3, a C-axis arc-shaped rack 23 is mounted on an upper surface of each of the X-axis sliding saddles 16. The C-axis arc-shaped rack 23 is in a circular arc shape, and the center of the C-axis arc-shaped rack 23 is close to the axis of the numerical control index plate 31. A C-axis straight tooth cylindrical gear 22 engaged with the C-axis arc-shaped rack 23 is mounted on an output shaft of a C-axis driving right-angle reduction motor 30, and the C-axis driving right-angle reduction motor 30 is mounted on an upper surface of a C-axis sliding saddle 2. C-axis circular arc-shaped guide rails 32 are arranged at two sides of the C-axis arc-shaped rack 23 and are concentric with the C-axis arc-shaped rack 23. The C-axis circular arc-shaped guide rails 32 are fixed to the upper surface of the X-axis sliding saddle 16, and the C-axis sliding saddle 2 is slidably cooperated with the two C-axis circular arc-shaped guide rails 32 through sliders on the bottom of the C-axis sliding saddle 2. The C-axis driving right-angle reduction motor 30, the C-axis straight tooth cylindrical gear 22, the C-axis arc-shaped rack 23, the C-axis sliding saddle 2, the C-axis circular arc-shaped guide rails 32, corresponding sliders and the like constitute a C-axis rotating mechanism.

As shown in FIGS. 1, 2, 3, and 4, a pillar mounting support 29 is arranged on the upper surface of each of the C-axis sliding saddles 2, and a pillar 19 is fixedly mounted on an upper surface of the pillar mounting support 29. The pillar 19 is preferably embodied as a hollow rectangular parallelepiped structure, and a length direction of the pillar 19 is perpendicular to the upper surface of the bed 13. The pillar mounting supports 29 at the left side and the right side are symmetrical, and the pillars 19 at the left side and the right side are also symmetrical. A Z-axis screw rod 27 is provided on a lateral side of each of the pillars 19, and the Z-axis screw rod 27 is perpendicular to the upper surface of the bed 13. The Z-axis screw rod 27 is supported on the lateral side of the pillar 19 by a bearing support. An upper end of the Z-axis screw rod 27 is coaxially connected to a Z-axis motor 6 through a coupler, and the Z-axis motor 6 is fixed to a top end of the pillar 19. A Z-axis screw rod nut seat threadedly mated with the Z-axis screw rod 27 is fixed to a back side of a Z-axis sliding saddle 5. Z-axis linear guide rails 28 are arranged symmetrically at two sides of the Z-axis screw rod 27 and are in parallel with the Z-axis screw rod 27, and the Z-axis linear guide rails 28 are fixed to the lateral side of the pillar 19. The Z-axis sliding saddle 5 is slidably cooperated with the two Z-axis linear guide rails 28 through sliders on the back side of the Z-axis sliding saddle 5. The Z-axis motor 6, the Z-axis screw rod 27, the Z-axis sliding saddle 5, the Z-axis linear guide rails 28, corresponding sliders and the like constitute a Z-axis feed mechanism.

As shown in FIGS. 1, 2, 3, and 4, a B-axis arc-shaped rack 26 is mounted on a front side of each of the Z-axis sliding saddles 5, and the B-axis arc-shaped rack 26 is in a circular arc shape. The B-axis arc-shaped racks 26 at the left side and the right side are symmetrical. The center of each of the B-axis arc-shaped racks 26 coincides with the center of a contact wheel of a respective grinding head mechanism 10, and a B-axis straight tooth cylindrical gear 25 engaged with the B-axis arc-shaped rack 26 is mounted on an output shaft of a B-axis driving right-angle reduction motor 17, and the B-axis driving right-angle reduction motor 17 is mounted at a front side of a B-axis sliding saddle 18. B-axis circular arc-shaped guide rails 4 are arranged at two sides of the B-axis arc-shaped rack 26 and are concentric with the B-axis arc-shaped rack 26. The B-axis circular arc-shaped guide rails 4 are fixed to the front side of the Z-axis sliding saddle 5, and the B-axis sliding saddle 18 is slidably cooperated with the two B-axis circular arc-shaped guide rails 4 through sliders on the back side of the B-axis sliding saddle 18. The B-axis driving right-angle reduction motor 17, the B-axis straight tooth cylindrical gear 25, the B-axis arc-shaped rack 26, the B-axis sliding saddle 18, the B-axis circular arc-shaped guide rails 4, corresponding sliders and the like constitute a B-axis rotation mechanism.

Figure 5:
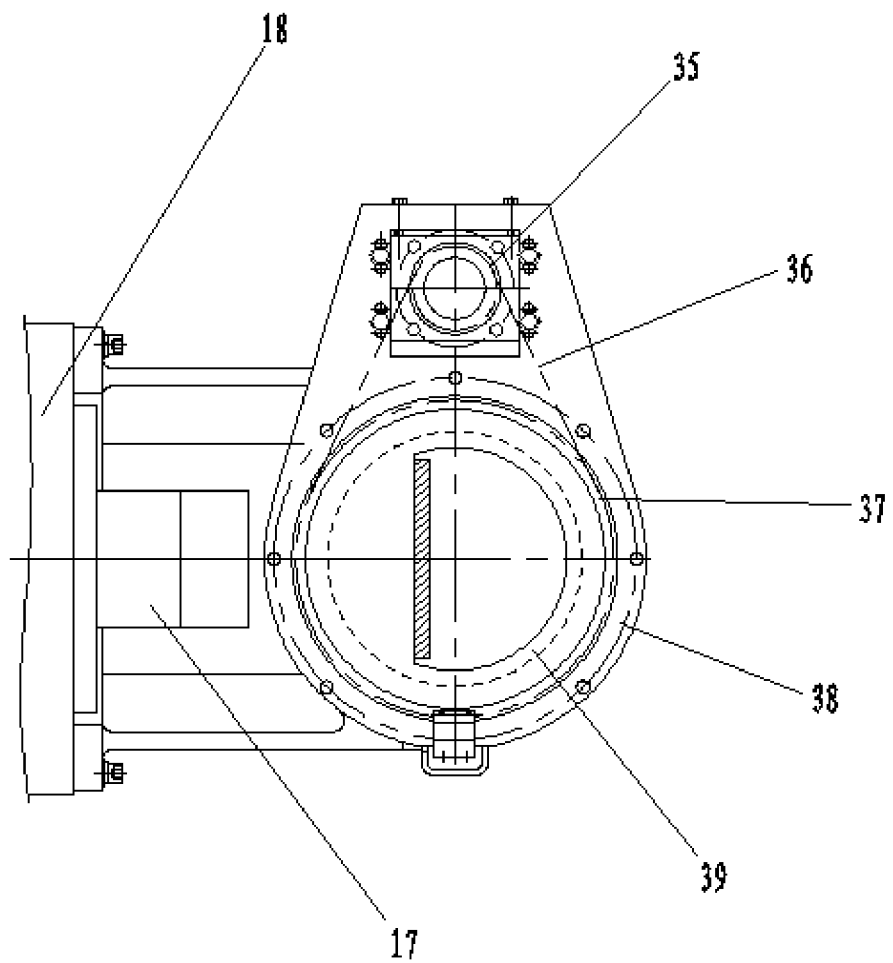
FIG. 5 is a schematic view of a B-axis sliding saddle with a grinding head mechanism mounted thereon.

As shown in FIGS. 1, 3 and 5, a housing 38 is provided on the front side of each of the B-axis sliding saddles 18, and the housing 38 is fixed to the respective B-axis sliding saddle 18, and a drum 39 is mounted in a mounting hole of the housing 38 by a bearing. A grinding head mechanism 10 is mounted on the drum 39, and the contact wheel of the grinding head mechanism 10 is toward the axis of the numerical control index plate 31. A synchronous driven pulley 37 is coaxially fixed to the drum 39, and is connected to a synchronous driving pulley 35 by a synchronous belt 36. The synchronous driving pulley 35 is sleeved on an output shaft of a grinding head rotation driving motor 7, and the grinding head rotation driving motor 7 is mounted on the B-axis sliding saddle 18. The housing 38, the drum 39, the synchronous driven pulley 37, the synchronous belt 36, the synchronous driving pulley 35 and the grinding head rotation driving motor 7 constitute a grinding head rotation mechanism, and a grinding head mounting plate (a structure indicated by elongated section lines inside the drum 39 in FIG. 5) passes through an inner cylinder of the drum 39.

As shown in FIG. 1, the grinding head mechanisms 10 at the left side and the right side are symmetrical, and each of the grinding head mechanisms 10 is composed of a grinding head motor 3, an abrasive belt, a driving wheel, a winding roller, a contact rod, a tension pulley, a contact wheel and the like, which are all mounted on a fixing plate 40. The grinding head mechanism 10 is driven by double motors, that is, having two grinding head motors 3. The abrasive belt is wound around the driving wheel and the contact wheel and is tensioned by the tension pulley, the contact wheel is mounted on the contact rod, and a power output shaft of the grinding head motor is in transmission cooperation with the driving wheel.

The present application has six degrees of freedom in space.

Under the action of the X-axis feed mechanism, the X-axis sliding saddle 16 can move rightward and leftward transversely on the Y-axis sliding saddle 11, to drive the C-axis sliding saddle 2 and the pillar 19 to make an X-axis movement, thereby achieving an X-axis movement of the contact wheel of the grinding head.

Under the action of the Y-axis feed mechanism, the Y-axis sliding saddle 11 can move forward and backward transversely on the Y-axis ram 1, to drive the X-axis sliding saddle 16, the C-axis sliding saddle 2 and the pillar 19 to make a Y-axis movement, thereby achieving a Y-axis movement of the contact wheel of the grinding head.

Under the action of the Z-axis feed mechanism, the Z-axis sliding saddle 5 can move upward and downward longitudinally on the pillar 19, to drive the B-axis sliding saddle 18 and the grinding head mechanism 10 to make a Z-axis movement, thereby achieving a Z-axis movement of the contact wheel of the grinding head.

Under the action of the B-axis driving right-angle reduction motor 17, the B-axis sliding saddle 18 makes a rotating and sliding movement on the pillar 19, to drive the grinding head mechanism 10 to make a rotating movement about a center axis of the contact wheel, thereby achieving a B-axis movement of the contact wheel.

Under the action of the C-axis driving right-angle reduction motor 30, the C-axis sliding saddle 2 makes a rotating and sliding movement on the X-axis sliding saddle 16, to drive the pillar 19 and the grinding head mechanism 10 to rotate about the C-axis, thereby achieving a C-axis movement of the contact wheel.

Under the action of the grinding head rotation driving motor 7, the synchronous driving pulley 35 drives the synchronous driven pulley 37 by the transmission of the synchronous belt 36 to rotate, hereby driving the drum 39 and the grinding head mechanism 10 to rotate, thereby achieving an A-axis movement of the contact wheel.

The preferred embodiments of the present application have been described in detail hereinbefore. It should be appreciated by the person skilled in the art that various modifications and variations may be made in accordance with the concepts of the present application without any creative efforts. Therefore, all the technical solutions obtained by the person skilled in the art according to the concepts of the present application on the basis of the conventional technology through logical analysis, reasoning, or limited experiments should be deemed to fall into the scope of protection of the present application as defined by the claims.

What is claimed is:

1. An abrasive belt grinding center applicable to grinding and polishing of a whole profile of a blisk, comprising a bed and a grinding head mechanism, wherein an index plate holder is arranged at a middle of an upper surface of the bed, and a numerical control index plate is mounted at a top end of the index plate holder, and a grinding robot is provided at a rear of the numerical control index plate;

a Y-axis ram is provided at each of a left side and a right side of the index plate holder, a Y-axis screw rod is rotatably supported on each of the Y-axis ram, and the Y-axis screw rod at the left side and the Y-axis screw rod at the right side are splayed apart; one end of each of the Y-axis screw rods is coaxially connected to a respective Y-axis motor through a respective coupler, and a Y-axis screw rod nut seat threadedly mated with each of the Y-axis screw rods is fixed to a bottom side of a respective Y-axis sliding saddle;

an X-axis screw rod is rotatably supported on each of the Y-axis sliding saddle, and is perpendicular to the respective Y-axis screw rod, one end of the X-axis screw rod is connected to an X-axis motor through a coupler, and an X-axis screw rod nut seat threadedly mated with the X-axis screw rod is fixed to a bottom side of an X-axis sliding saddle;

a C-axis arc-shaped rack is mounted on an upper surface of the X-axis sliding saddle, a center of the C-axis arc-shaped rack is close to an axis of the numerical control index plate, a C-axis straight tooth cylindrical gear engaged with the C-axis arc-shaped rack is mounted on an output shaft of a C-axis driving right-angle reduction motor, and the C-axis driving right-angle reduction motor is mounted on an upper surface of a C-axis sliding saddle;

a pillar mounting support is provided on the upper surface of the C-axis sliding saddle, and a pillar is fixedly mounted on an upper surface of the pillar mounting support, a Z-axis screw rod is rotatably supported on a lateral side of the pillar, an upper end of the Z-axis screw rod is coaxially connected to a Z-axis motor through a coupler, the Z-axis motor is fixed to a top end of the pillar, and a Z-axis screw rod nut seat threadedly mated with the Z-axis screw rod is fixed to a back side of a Z-axis sliding saddle;

a B-axis arc-shaped rack is mounted on a front side of the Z-axis sliding saddle, a center of the B-axis arc-shaped rack coincides with a center of a contact wheel of the respective grinding head mechanism, and a B-axis straight tooth cylindrical gear engaged with the B-axis arc-shaped rack is mounted on an output shaft of a B-axis driving right-angle reduction motor, and the B-axis driving right-angle reduction motor is mounted on a front side of a B-axis sliding saddle; and a housing is provided on the front side of the B-axis sliding saddle, and a drum is mounted in a mounting hole of the housing by a bearing; the grinding head mechanism is mounted on the drum, and the contact wheel of the grinding head mechanism is toward the axis of the numerical control index plate, a synchronous driven pulley is coaxially fixed to the drum and is connected to a synchronous driving pulley by a synchronous belt, the synchronous driving pulley is sleeved on an output shaft of a grinding head rotation driving motor, and the grinding head rotation driving motor is mounted on the B-axis sliding saddle.

2. The abrasive belt grinding center applicable to grinding and polishing of the whole profile of the blisk according to claim 1, wherein the grinding robot is mounted on a robot mounting support, the robot mounting support is fixed to the index plate holder, and the robot mounting support is in parallel with the upper surface of the bed.

3. The abrasive belt grinding center applicable to grinding and polishing of the whole profile of the blisk according to claim 1, wherein each of the Y-axis screw rods is supported on the respective Y-axis ram by a respective bearing support, two Y-axis linear guide rails are symmetrically arranged at two sides of each of the Y-axis screw rods respectively and are in parallel with the Y-axis screw rod, and the two Y-axis linear guide rails are fixed to an upper surface of the Y-axis ram, and the Y-axis sliding saddle is slidably cooperated with the two Y-axis linear guide rails through sliders on a bottom of the Y-axis sliding saddle.

4. The abrasive belt grinding center applicable to grinding and polishing of the whole profile of the blisk according to claim 1, wherein the X-axis screw rod is supported on an upper surface of the Y-axis sliding saddle by a bearing support, two X-axis linear guide rails are symmetrically arranged at two sides of the X-axis screw rod respectively and are in parallel with the X-axis screw rod, and the two X-axis linear guide rails are fixed to the upper surface of the Y-axis sliding saddle, and the X-axis sliding saddle is slidably cooperated with the two X-axis linear guide rails through sliders on a bottom of the X-axis sliding saddle.

5. The abrasive belt grinding center applicable to grinding and polishing of the whole profile of the blisk according to claim 4, wherein two C-axis circular arc-shaped guide rails are arranged at two sides of the C-axis arc-shaped rack respectively and are concentric with the C-axis arc-shaped rack, the two C-axis circular arc-shaped guide rails are fixed to the upper surface of the X-axis sliding saddle, and the C-axis sliding saddle is slidably cooperated with the two C-axis circular arc-shaped guide rails through sliders on a bottom of the C-axis sliding saddle.

6. The abrasive belt grinding center applicable to grinding and polishing of the whole profile of the blisk according to claim 5, wherein the Z-axis screw rod is supported on the lateral side of the pillar by a bearing support, two Z-axis linear guide rails are arranged symmetrically at two sides of the Z-axis screw rod respectively and are in parallel with the Z-axis screw rod, the two Z-axis linear guide rails are fixed to the lateral side of the pillar, and the Z-axis sliding saddle is slidably cooperated with the two Z-axis linear guide rails through sliders on the back side of the Z-axis sliding saddle.

7. The abrasive belt grinding center applicable to grinding and polishing of the whole profile of the blisk according to claim 6, wherein two B-axis circular arc-shaped guide rails are arranged at two sides of the B-axis arc-shaped rack respectively and are concentric with the B-axis arc-shaped rack, the two B-axis circular arc-shaped guide rails are fixed to the front side of the Z-axis sliding saddle, and the B-axis sliding saddle is slidably cooperated with the two B-axis circular arc-shaped guide rails through sliders on a back side of the B-axis sliding saddle.

8. The abrasive belt grinding center applicable to grinding and polishing of the whole profile of the blisk according to claim 6, wherein the bed has a rectangular parallelepiped structure, the pillar has a hollow rectangular parallelepiped structure, and a length direction of the pillar is perpendicular to the upper surface of the bed.

9. The abrasive belt grinding center applicable to grinding and polishing of the whole profile of the blisk according to claim 2, wherein the X-axis screw rod is supported on an upper surface of the Y-axis sliding saddle by a bearing support, two X-axis linear guide rails are symmetrically arranged at two sides of the X-axis screw rod respectively and are in parallel with the X-axis screw rod, and the two X-axis linear guide rails are fixed to the upper surface of the Y-axis sliding saddle, and the X-axis sliding saddle is slidably cooperated with the two X-axis linear guide rails through sliders on a bottom of the X-axis sliding saddle.

10. The abrasive belt grinding center applicable to grinding and polishing of the whole profile of the blisk according to claim 9, wherein two C-axis circular arc-shaped guide rails are arranged at two sides of the C-axis arc-shaped rack respectively and are concentric with the C-axis arc-shaped rack, the two C-axis circular arc-shaped guide rails are fixed to the upper surface of the X-axis sliding saddle, and the C-axis sliding saddle is slidably cooperated with the two C-axis circular arc-shaped guide rails through sliders on a bottom of the C-axis sliding saddle.

11. The abrasive belt grinding center applicable to grinding and polishing of the whole profile of the blisk according to claim 10, wherein the Z-axis screw rod is supported on the lateral side of the pillar by a bearing support, two Z-axis linear guide rails are arranged symmetrically at two sides of the Z-axis screw rod respectively and are in parallel with the Z-axis screw rod, the two Z-axis linear guide rails are fixed to the lateral side of the pillar, and the Z-axis sliding saddle is slidably cooperated with the two Z-axis linear guide rails through sliders on the back side of the Z-axis sliding saddle.

12. The abrasive belt grinding center applicable to grinding and polishing of the whole profile of the blisk according to claim 11, wherein two B-axis circular arc-shaped guide rails are arranged at two sides of the B-axis arc-shaped rack respectively and are concentric with the B-axis arc-shaped rack, the two B-axis circular arc-shaped guide rails are fixed to the front side of the Z-axis sliding saddle, and the B-axis sliding saddle is slidably cooperated with the two B-axis circular arc-shaped guide rails through sliders on a back side of the B-axis sliding saddle.

13. The abrasive belt grinding center applicable to grinding and polishing of the whole profile of the blisk according to claim 11, wherein the bed has a rectangular parallelepiped structure, the pillar has a hollow rectangular parallelepiped structure, and a length direction of the pillar is perpendicular to the upper surface of the bed.

14. The abrasive belt grinding center applicable to grinding and polishing of the whole profile of the blisk according to claim 3, wherein the X-axis screw rod is supported on an upper surface of the Y-axis sliding saddle by a bearing support, two X-axis linear guide rails are symmetrically arranged at two sides of the X-axis screw rod respectively and are in parallel with the X-axis screw rod, and the two X-axis linear guide rails are fixed to the upper surface of the Y-axis sliding saddle, and the X-axis sliding saddle is slidably cooperated with the two X-axis linear guide rails through sliders on a bottom of the X-axis sliding saddle.

15. The abrasive belt grinding center applicable to grinding and polishing of the whole profile of the blisk according to claim 14, wherein two C-axis circular arc-shaped guide rails are arranged at two sides of the C-axis arc-shaped rack respectively and are concentric with the C-axis arc-shaped rack, the two C-axis circular arc-shaped guide rails are fixed to the upper surface of the X-axis sliding saddle, and the C-axis sliding saddle is slidably cooperated with the two C-axis circular arc-shaped guide rails through sliders on a bottom of the C-axis sliding saddle.

16. The abrasive belt grinding center applicable to grinding and polishing of the whole profile of the blisk according to claim 15, wherein the Z-axis screw rod is supported on the lateral side of the pillar by a bearing support, two Z-axis linear guide rails are arranged symmetrically at two sides of the Z-axis screw rod respectively and are in parallel with the Z-axis screw rod, the two Z-axis linear guide rails are fixed to the lateral side of the pillar, and the Z-axis sliding saddle is slidably cooperated with the two Z-axis linear guide rails through sliders on the back side of the Z-axis sliding saddle.

17. The abrasive belt grinding center applicable to grinding and polishing of the whole profile of the blisk according to claim 16, wherein two B-axis circular arc-shaped guide rails are arranged at two sides of the B-axis arc-shaped rack respectively and are concentric with the B-axis arc-shaped rack, the two B-axis circular arc-shaped guide rails are fixed to the front side of the Z-axis sliding saddle, and the B-axis sliding saddle is slidably cooperated with the two B-axis circular arc-shaped guide rails through sliders on a back side of the B-axis sliding saddle.

18. The abrasive belt grinding center applicable to grinding and polishing of the whole profile of the blisk according to claim 16, wherein the bed has a rectangular parallelepiped structure, the pillar has a hollow rectangular parallelepiped structure, and a length direction of the pillar is perpendicular to the upper surface of the bed.

* * * * *